C. SEEWALD.
VEHICLE WHEEL.
APPLICATION FILED APR. 22, 1907.
898,608.
Patented Sept. 15, 1908.
2 SHEETS—SHEET 2.
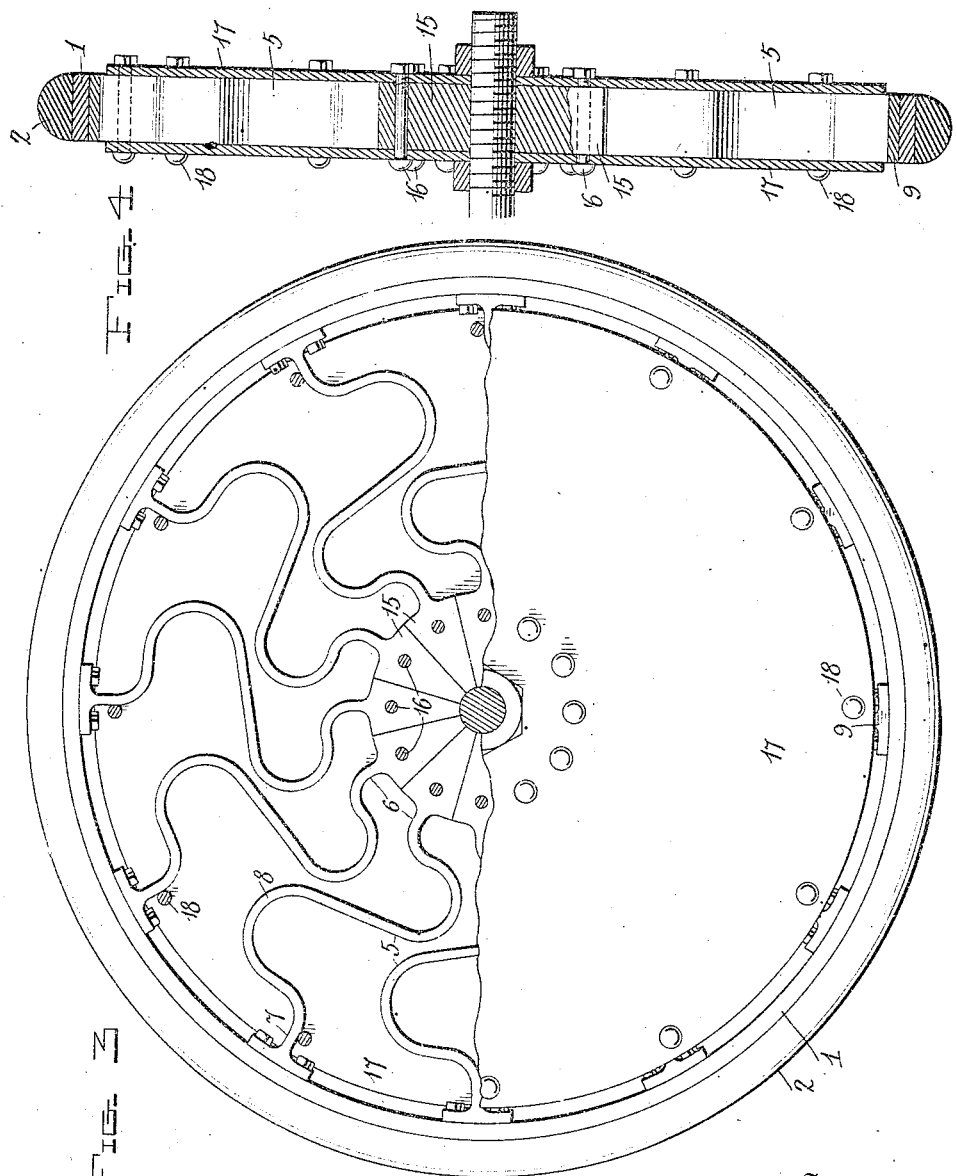
Witnesses
Inventor
Christian Seewald
by H. B. Willson & Co.
Attorneys

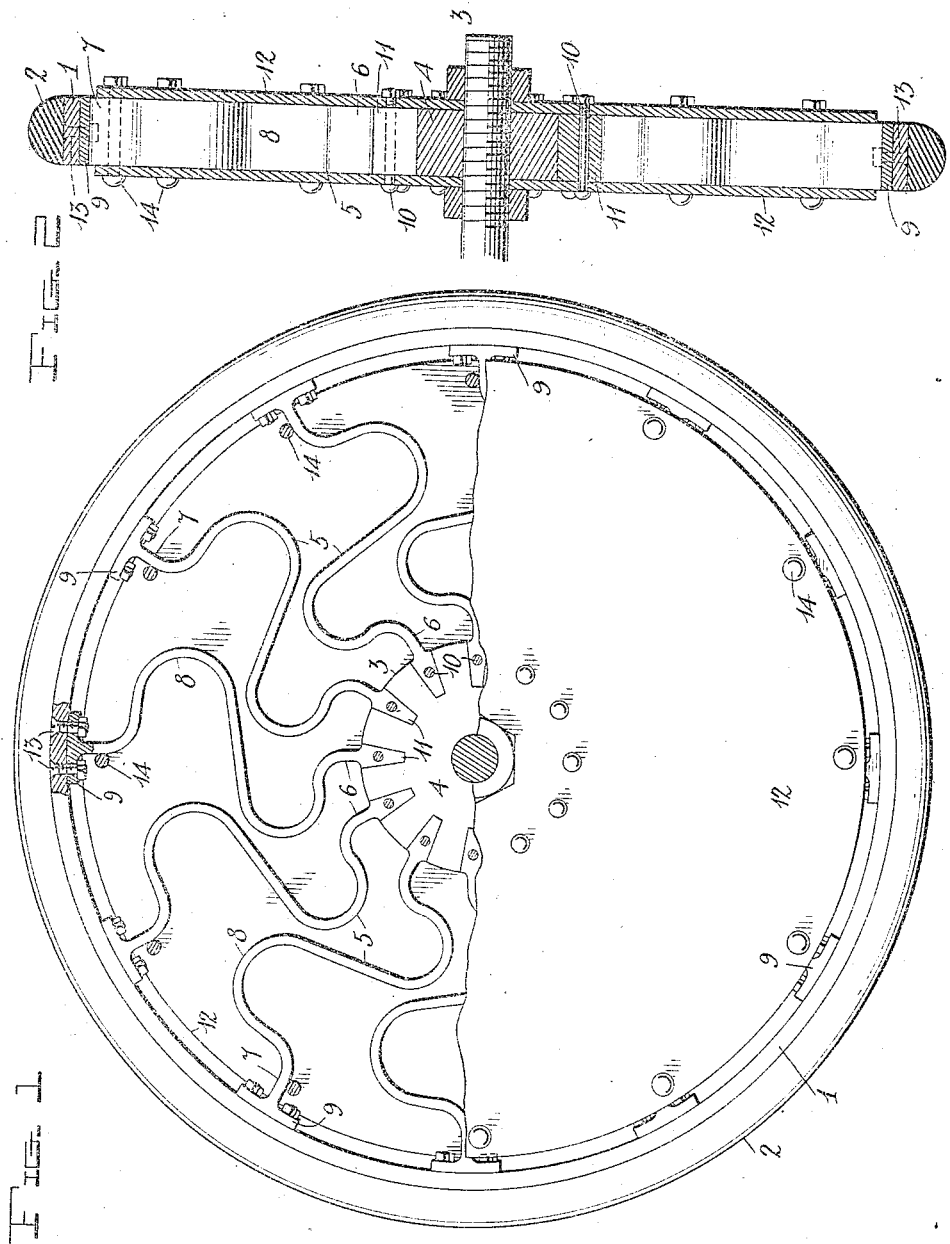

UNITED STATES PATENT OFFICE.

CHRISTIAN SEEWALD, OF WILLIAMSPORT, PENNSYLVANIA.

VEHICLE-WHEEL.

No. 898,608.  Specification of Letters Patent.  Patented Sept. 15, 1908.

Application filed April 22, 1907. Serial No. 369,540.

*To all whom it may concern:*

Be it known that I, CHRISTIAN SEEWALD, a citizen of the United States, residing at Williamsport, in the county of Lycoming and State of Pennsylvania, have invented certain new and useful Improvements in Vehicle-Wheels; and I do declare the following to be a full, clear, and exact description of the invention, such as will enable others skilled in the art to which it appertains to make and use the same.

This invention relates to improvements in vehicle wheels, especially with reference to the provision of yielding, spring-metal spokes, which serve to cushion the wheels and obviate the necessity of employing pneumatic or cushion tires for the wheels.

Another feature of the invention is the provision of disks at the outer ends of the hub bearing against the inner and outer sides of the spokes to stiffen them laterally.

Another feature is the provision, in connection with such stiffening disks, of devices connecting said disks to bear against the spokes near their outer ends.

With the above and other objects in view, the invention consists of certain novel features of construction, combination and arrangement of devices, hereinafter described and claimed.

In the accompanying drawings,—Figure 1 is partly a side elevation and partly a section of a vehicle wheel constructed in accordance with my invention; Fig. 2 is a vertical transverse sectional view of the same; Fig. 3 is a view similar to Fig. 1, illustrating a modification; Fig. 4 is a transverse sectional view of the same.

The rim 1 of the wheel is here shown as a flat band. The tire 2 is shown as having an oval or rounded tread surface and a flat or square rim-engaging surface. The rim and the tire may be of any suitable construction and I do nor desire to limit myself in this particular. The hub 3 is composed of a central section 4 of cylindrical form, and disks 12.

The spokes 5 are made of spring metal. They are here shown as flat bars, but they may be cylindrical or of any other form, and I do not desire to limit myself in this particular. The inner and outer portions 6, 7, of the spokes are shown in Figs. 1, 2, 3 and 4 of the drawings, as straight and disposed radially with reference to the wheel, the intermediate portions 8 of the spokes being shown as bent reversely in the form of a compound curve, so that the said spokes are adapted to yield and spring longitudinally, as will be understood.

The spokes are provided at their outer ends with ears or lugs 9, which extend in opposite directions, bear on the inner side of the rim, and are secured thereto by bolts or other suitable devices 13. The inner ends 11 of the spokes are wedge-shaped and extend into similar-shaped radial openings in the central portion 4 of the hub. The disks 12 on the ends of the hub bear against the sides of the spokes and said disks are sufficiently large to extend nearly to the rim of the wheel, so that they serve to nearly incase the spokes. It will be understood that these disks by bearing against the sides of the spokes and extending nearly to their outer ends, serve to brace the spokes laterally and prevent them from yielding, and the wheel from becoming dished when subjected to lateral stress, such as is occasioned when the vehicle is turning a corner. In order to prevent the spokes from bending to an undesirable extent when the wheel is employed as a driving wheel for an automobile vehicle, or for other purposes, I provide bolts or pins 14, which connect the disks 12 and bear against the spokes near their outer ends. When power is applied to the central portion of the wheel to cause the same to turn, in one direction, the hub tends to describe angular motion with reference to the rim, and such angular motion causes the bolts or pins 14 to bear against the outer portions of the spokes, and transmit the driving stress to said outer ends.

A wheel constructed as herein shown and described, will possess all of the elasticity or spring afforded by the usual pneumatic tire, and will overcome the trouble occasioned by the puncturing or bursting of such tire.

In the form of my invention shown in Figs. 3 and 4, the central portion of the hub is dispensed with, and the inner wedge-shaped ends 15 of the spokes are broadened, so that they bear against one another. The bolts 16 which connect the disks 17 to the central portion of the wheel pass through openings near the inner ends of said spokes. The bolts 18, shown in said figures, are similar to and perform the same function as the bolts 14 shown in Figs. 1 and 2.

From the foregoing description, taken in connection with the accompanying drawings, the construction and operation of the invention will be really understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. A vehicle wheel having a hub, spring spokes with their inner ends secured to said hub, a rim to which the outer ends of said spokes are fastened, disks at the ends of the hub bearing respectively against the opposite sides of the spokes and means connecting said disks and engaging said spokes near the outer ends for transmitting driving stress to said spokes near their outer ends.

2. A vehicle wheel having spring spokes and disks on the opposite sides of said spokes connected to the inner portions thereof, said disks incasing said spokes throughout the greater portion of their length for bracing them laterally and pins connecting said disks near their outer edges and arranged to bear against the outer ends of the spokes.

In testimony whereof I have hereunto set my hand in presence of two subscribing witnesses.

CHRISTIAN SEEWALD.

Witnesses:
JOHN C. ROGERS,
A. M. HOAGLAND.